(12) United States Patent
Hafner et al.

(10) Patent No.: US 7,013,205 B1
(45) Date of Patent: Mar. 14, 2006

(54) SYSTEM AND METHOD FOR MINIMIZING ENERGY CONSUMPTION IN HYBRID VEHICLES

(75) Inventors: James Lee Hafner, San Jose, CA (US); John Anthony Tomlin, Sunnyvale, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/992,840

(22) Filed: Nov. 22, 2004

(51) Int. Cl.
*B60K 6/04* (2006.01)
*B60L 9/00* (2006.01)
*B60L 11/00* (2006.01)

(52) U.S. Cl. .............. 701/22; 903/908; 180/65.2; 180/65.6; 180/165; 475/1

(58) Field of Classification Search ............ 701/22, 701/213; 180/65.2, 65.4, 65.6, 165; 903/908; 475/1; B60L 11/14
See application file for complete search history.

(56) References Cited

U.S. PATENT DOCUMENTS

| | | | |
|---|---|---|---|
| 4,306,156 A * | 12/1981 | Monaco et al. ............ 290/17 |
| 4,351,405 A * | 9/1982 | Fields et al. ............ 180/65.2 |
| 5,176,213 A * | 1/1993 | Kawai et al. ............ 180/243 |
| 5,343,970 A * | 9/1994 | Severinsky ............ 180/65.2 |
| 5,359,228 A * | 10/1994 | Yoshida ............ 290/17 |
| 5,441,122 A * | 8/1995 | Yoshida ............ 180/65.2 |
| 5,487,002 A * | 1/1996 | Diller et al. ............ 701/1 |
| 5,492,189 A * | 2/1996 | Kriegler et al. ............ 180/65.2 |
| 5,492,190 A * | 2/1996 | Yoshida ............ 180/65.4 |
| 5,566,774 A * | 10/1996 | Yoshida ............ 180/65.4 |
| 5,627,752 A * | 5/1997 | Buck et al. ............ 701/35 |
| 5,675,205 A * | 10/1997 | Jacob et al. ............ 310/239 |
| 5,778,326 A * | 7/1998 | Moroto et al. ............ 701/22 |
| 6,278,915 B1 * | 8/2001 | Deguchi et al. ............ 701/22 |
| 6,480,767 B1 * | 11/2002 | Yamaguchi et al. ............ 701/22 |

(Continued)

FOREIGN PATENT DOCUMENTS

AU    2003208173 A1 *  9/2003

(Continued)

OTHER PUBLICATIONS

Galdi et al., Multi-objective optimization for fuel economy and emissions of HEV using the goal-attainingment method, EVA 18, published in 2001.*

(Continued)

*Primary Examiner*—Cuong Nguyen
(74) *Attorney, Agent, or Firm*—Whitham, Curtis & Christofferson, P.C.; Stephen C. Kaufman

(57) ABSTRACT

The present invention provides a system and method relating to the operation of plug-in hybrid electric vehicles powered both by electricity from rechargeable batteries and by consumable fuel powered means, such as an internal combustion engine or a fuel cell. More particularly, the system and method of the claimed invention enable optimization of the energy cost associated with the operation of such plug-in hybrid electric vehicles, especially when the cost of recharging batteries from external electric power sources may be less than the cost of recharging batteries from the onboard consumable fuel powered means. To this end, the invention enables maximization of the use of electricity from external electric power sources and minimization of the use of electricity produced by the plug-in hybrid electric vehicle's onboard consumable fuel powered means, when the cost of recharging batteries from external electric power sources is less than the cost of recharging batteries from the onboard consumable fuel powered means.

32 Claims, 5 Drawing Sheets

U.S. PATENT DOCUMENTS

| | | | |
|---|---|---|---|
| 6,609,582 B1 * | 8/2003 | Botti et al. | 180/65.3 |
| 6,629,024 B1 * | 9/2003 | Tabata et al. | 701/22 |
| 6,909,200 B1 * | 6/2005 | Bouchon | 307/10.1 |
| 6,915,869 B1 * | 7/2005 | Botti et al. | 180/65.3 |
| 2002/0062183 A1 * | 5/2002 | Yamaguchi et al. | 701/22 |
| 2002/0116099 A1 * | 8/2002 | Tabata et al. | 701/22 |
| 2002/0153726 A1 * | 10/2002 | Sumner | 290/1 A |
| 2003/0168263 A1 * | 9/2003 | Botti et al. | 180/65.1 |
| 2004/0055586 A1 * | 3/2004 | Botti et al. | 123/585 |
| 2004/0158365 A1 * | 8/2004 | Tabata et al. | 701/22 |
| 2005/0008904 A1 * | 1/2005 | Suppes | 429/9 |
| 2005/0104465 A1 * | 5/2005 | Darday | 310/103 |

FOREIGN PATENT DOCUMENTS

| | | | |
|---|---|---|---|
| JP | 2000-279519 | * | 9/2000 |
| JP | 2000-289355 | * | 9/2000 |
| WO | WO 2003075440 A1 * | | 9/2003 |

OTHER PUBLICATIONS

Suppes, Power supply used as battery for plug-in hybrid electric vehicle, comprises battery pack, fuel cell, hydrogen fuel tank, and controller, DERWENT-ACC-NO: 2005-090393, published on Jan. 13, 2005.*

Ackerman, Hybrid Vehicle Cruises for Battle, SIGNAL AFCEA's International Journal, published on Apr. 2004 (4 pages).*

Eric Powers, About "PHEV"—Plug In Hybrid Electric Vehicles, published in 2005 (from http://hybridcars.about.com/.*

Unknown author, CalCars' Vehicles: All about plug-in hybrids (PHEVs)/Gas-Optional Hybrids (GO-HEVs), published in 2005, 5 pages from http://www.calcars.org/vehicles.html.*

From http://www.hybridcars.com/plugin-hybrids.html and http://www.iags.org/pih.htm, Plug-In Hybrids, printed in 2005.*

From http://www.I3research.com/vehicles/enigma/specifications.htm, printed in 2005 (4 pages).*

Unknown author, Kangoo reinvents the electric car, Renault, Mar. 10, 2003 (9 pages—http://evworld.com/modules/).*

* cited by examiner

SYSTEM AND METHOD FOR MINIMIZING ENERGY CONSUMPTION IN HYBRID VEHICLES

BACKGROUND OF THE INVENTION

1. Field of the Invention

The present invention generally relates to the operation of hybrid vehicles powered both by electricity from rechargeable batteries and by consumable fuel powered means, such as an internal combustion engine or a fuel cell, and, more particularly, to optimizing the cost of operating such a hybrid vehicle, especially when the cost of recharging batteries from external electric power sources may be less than the cost of recharging batteries from the onboard consumable fuel powered means. To this end, the present invention enables maximization of the use of electricity from external electric power sources and minimization of the use of electricity produced by the hybrid vehicle's onboard consumable fuel powered means, when the cost of recharging batteries from external electric power sources is less than the cost of recharging batteries from the onboard consumable fuel powered means.

2. Background Description

Hybrid vehicles, which use a combination of consumable fuel (such as gasoline, natural gas, hydrogen, and others) and battery-stored electricity are becoming a major segment of the automobile market. Such hybrid vehicles are displacing electric-only vehicles, as well as conventional vehicles powered solely by internal combustion engines or other consumable fuel powered means.

The electric power system of a prior-art electric-only vehicle is open, in the sense that such a vehicle lacks an onboard means to recharge the battery and therefore must be recharged from an external source. By contrast, the electrical power system of a prior-art hybrid vehicle is closed, in the sense that such a vehicle is not recharged from external sources but is instead recharged from an onboard consumable fuel powered means, which may be an internal combustion engine (powered by gasoline, diesel, ethanol, natural gas, hydrogen or another combustible fuel) or which may be a hydrogen fuel cell or other alternative consumable-fuel-based power unit.

Prior-art electric-only vehicles thus employ an open system in which batteries are recharged from an external electric power source, which may be conventional house current, a publicly accessible recharging facility, or any external source of electric power compatible with the vehicle's recharging system. Recharging such an electric-only vehicle from conventional house current alone may limit the useful range of the vehicle to no more than the distance that can be traveled on a single battery charge per round trip. External electric power sources for recharging electric-only vehicles could be provided at publicly accessible facilities; however, such facilities have, to date, not become widely available.

Prior-art hybrid vehicles employ a closed system in which the vehicle power system incorporates both a battery powered electric motor and a consumable fuel powered means from which the battery may be recharged. Power may be provided to the vehicle drive system by the electric motor and/or the consumable fuel powered means. Hybrid vehicles can refuel using consumable fuels, including but not limited to fuels which may be available from filling stations, without regard to availability of an external electric power source suitable for recharging. Access to an external electric power source is not required for recharging a hybrid vehicle, because a hybrid vehicle's batteries are recharged from the vehicle's onboard consumable fuel powered means.

A problem confronting prior-art hybrid vehicles is that recharging from the vehicle's onboard consumable fuel powered means makes the cost of recharging directly proportional to the cost of consumable fuel. That problem does not present itself with prior-art electric-only vehicles, where batteries are recharged from an external electric power source. As noted above, however, such electric-only vehicles may be less practical in that their range is limited when external electric power sources are not available for recharging along the route of travel.

The present invention thus relates to plug-in hybrid electric vehicles, which differ from conventional hybrid vehicles in that a plug-in hybrid electric vehicle has the ability to recharge its batteries either from a source outside the vehicle (such as by way of an electric plug) or from an onboard means (such as an engine or other consumable fuel powered means), whereas a conventional hybrid vehicle can be recharged only from its onboard engine. Plug-in hybrid electric vehicles thus combine the ability of prior-art electric-only vehicles to recharge from an external electric power source using electric power generated by any cost-effective means available with the ability of prior-art hybrid vehicles to recharge from the onboard consumable fuel powered means. The present invention accomplishes this in a manner that takes into account the fact that there may be times when the cost of recharging from the onboard consumable fuel powered means is not greater than the cost of recharging from an external electric power source, at which times it may be preferable not to recharge from an external electric power source.

Merely adding a capability to recharge a prior-art hybrid vehicle from an external electric power source, like an electric-only vehicle, would be inadequate, because it would not ensure an optimally cost-effective allocation between recharging from external electric power sources and recharging from the onboard consumable fuel powered means. In addition, there may be circumstances in which taking a detour in excess of a certain distance, solely for the purpose of recharging from an external electric power source, would be less cost-effective than relying on an onboard consumable fuel powered means for a complete or partial charge to extend the vehicle's range to reach an external electric power source closer to the route.

As a result, the present invention is directed to minimizing a plug-in hybrid electric vehicle's energy cost when the cost of recharging from external electric power sources is less than the cost of recharging from the onboard consumable fuel powered means. As noted, when energy from external electric power sources is less costly than energy produced by consumable fuel powered means, reliance solely on the onboard consumable fuel powered means may sacrifice cost-effectiveness. At the same time, reliance solely on external electric power sources may sacrifice practicality or range when availability of external electric power sources is not adequate for recharging en route.

The complexity of addressing such problems is increased by the fact that, in some embodiments, solutions change as the vehicle changes its position relative to available external electric power sources, which is something a vehicle necessarily does when it is put to its intended use of moving from place to place.

SUMMARY OF THE INVENTION

It is therefore an object of the present invention to provide a system and method for minimizing consumable fuel consumption in plug-in hybrid electric vehicles by enabling the optimal use of electric input from external electric power sources in a manner that takes into account the location of the vehicle relative to external electric power sources as the vehicle moves from place to place during the ordinary course of its intended use as a transportation device. According to the invention, there is a plug-in hybrid electric vehicle in which the electric power system is open so that the battery may be recharged from standard electric power sources when such sources are available. The invention also provides a system and method for managing the consumption ratio between electric charge and consumable fuel so that consumption of consumable fuel may be optimized for cost-effectiveness. As a result, an optimal mix of energy from external electric power sources and energy from consumable fuel may be maintained, especially when energy from external electric power sources is available to the vehicle at lower cost than energy from the onboard consumable fuel powered means.

In the preferred embodiments, cost minimization is determined by a computer, using as data inputs at least the following: itinerary data (including, but not limited to, original and present location of the vehicle, as well as the destination and/or the route to be taken); available battery charge; operational data (including, but not limited to, performance specification data, vehicle driving history data, and/or other operational data); availability of recharge facilities en route or at the destination; cost of energy from available external electric power sources; cost of energy from onboard consumable fuel powered means; and/or other data. Said data inputs may include any or all of the following: transmitted data; database data; operator input data; and/or data from other sources. Said itinerary data may include, but is not limited to, global positioning satellite (GPS) data and/or other location identification information.

In the preferred embodiments, the computer may receive either operator input instructions or automated instructions. In some embodiments, if there are no external electric power sources available for recharging batteries at or en route to the destination, or if the cost of recharging from an external electric power source is not less than the cost of recharging from the vehicle's onboard consumable fuel powered means, then the computer will return the solution that external electric power sources should not be used. If, however, there are external electric power sources available for recharging batteries at or en route to the destination, and if the cost of recharging from an external electric power source is less than the cost of recharging from the vehicle's onboard consumable fuel powered means, then the computer will compute an optimal usage profile for the electric and conventional fuel to minimize energy cost of the trip.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF A PREFERRED EMBODIMENT OF THE INVENTION

Figure 1:
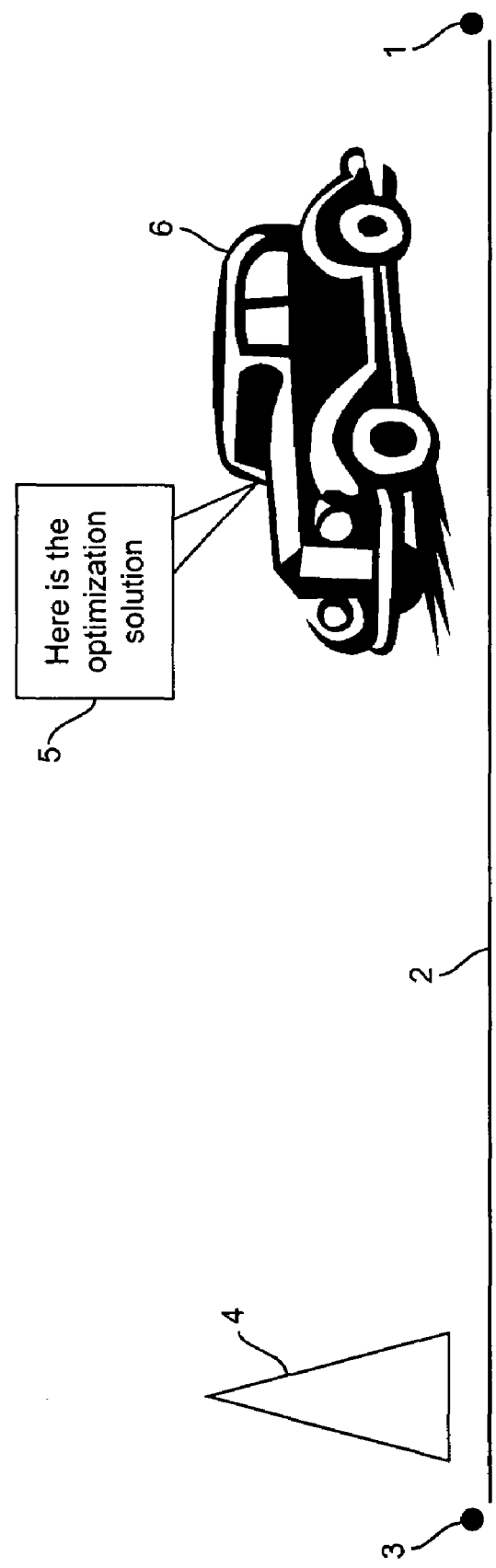
FIG. 1 is a representation of a hybrid vehicle traveling from an original location to a destination along a route on which there is an external power source suitable for recharging. The hybrid vehicle includes an audio and/or visual display by which a computer can provide output to an operator.

Referring now to the drawings, and more particularly to FIG. 1, there is shown a hybrid vehicle 6 traveling on an itinerary that leads from an original location 1 along a route 2 to a destination 3. Along the route, there is at least one external power source 4 suitable for recharging. The hybrid vehicle 6 includes an audio and/or visual display 5 by which a computer can provide output to an operator for additional input. The audio and/or visual display 5 of FIG. 1 is exemplary of the audio and/or visual display 500 of FIGS. 2–4.

Figure 2:
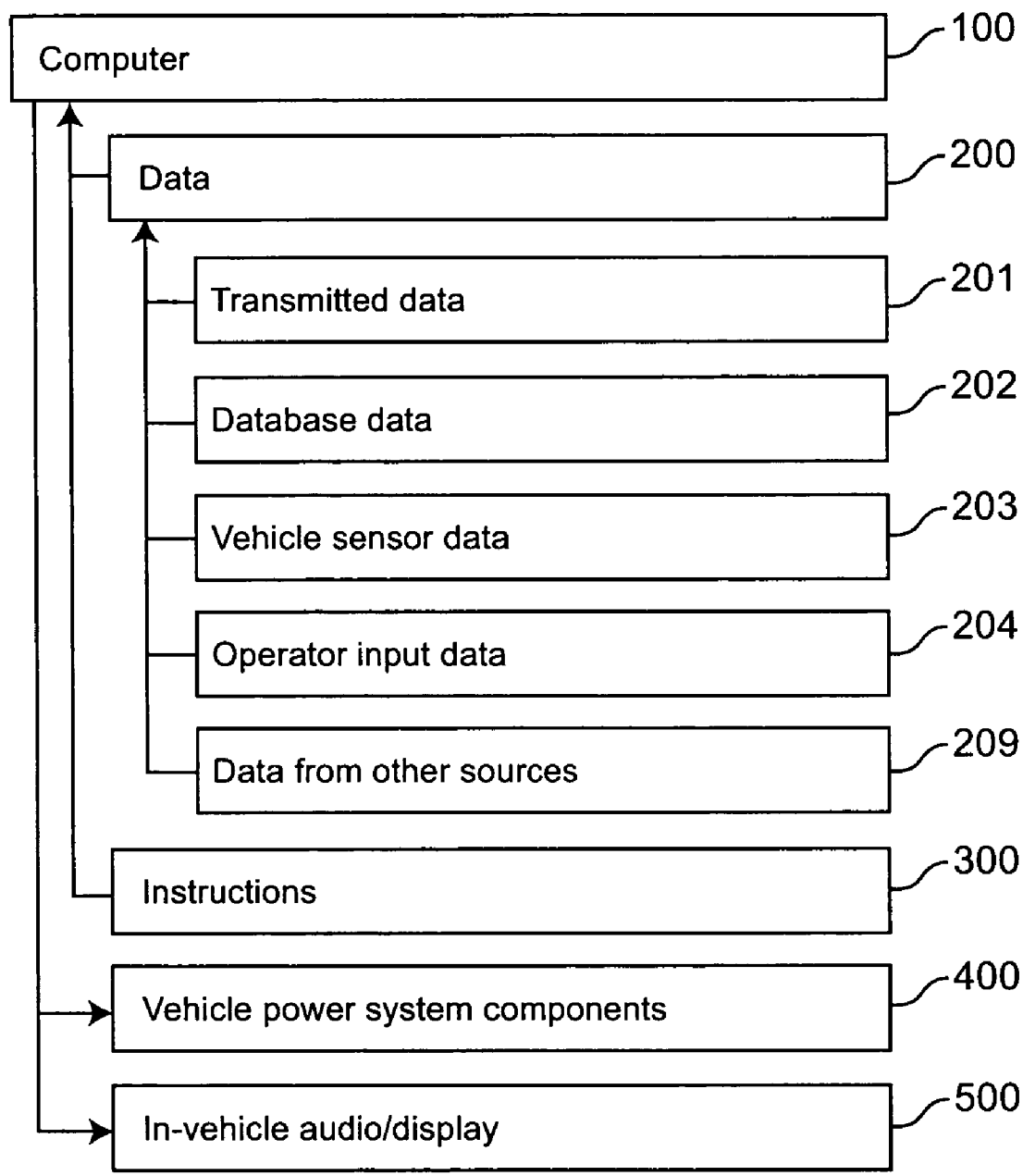
FIG. 2 is a representation of a computer, which is connected to the vehicle and to data sources and which may receive instructions. The data sources in FIG. 2 are described in terms of how the data is provided, including, but not limited to, transmitted data, database data, vehicle sensor data, operator input data, and data from other sources.

Referring now to FIG. 2, there is shown a computer 100 receiving as inputs data 200 and instructions 300. The data 200 may come from various sources, such as transmitted data 201, database data 202, vehicle sensor data 203, operator input data 204, and data from other sources 205. FIG. 2 also shows that outputs from the computer 100 may go directly to vehicle power system components 400 or may be presented to the operator via an in-vehicle audio and/or visual display 500.

Figure 3:
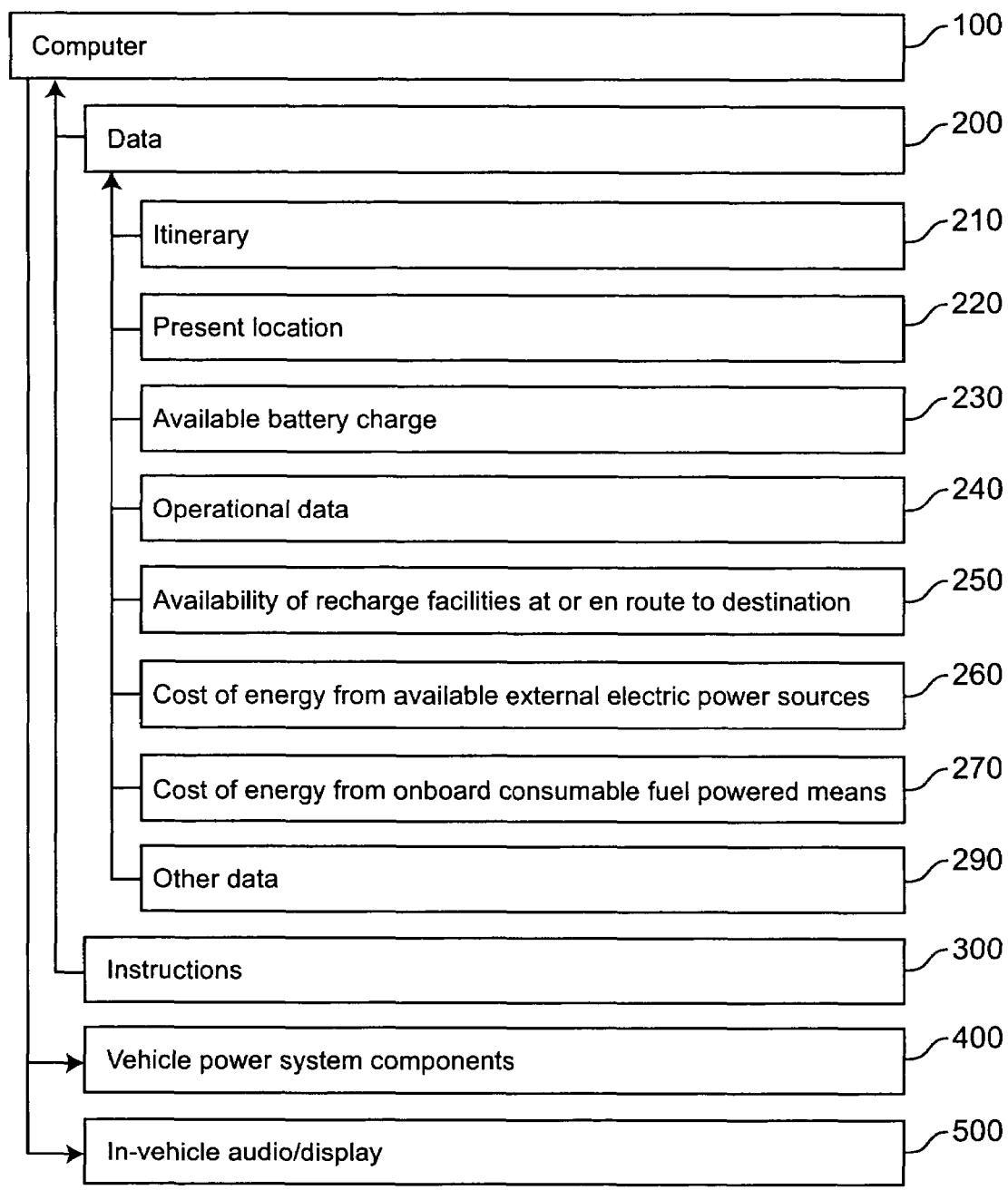
FIG. 3 is a representation of a computer, which is connected to the vehicle and to data sources and which may receive instructions. The data sources in FIG. 3 are described in terms of the kind of information contained in the data, including, but not limited to, itinerary data, present location data, available battery charge, operational data, availability of recharge facilities at or en route to destination, cost of energy from available external electric power sources, cost of energy from onboard consumable fuel powered means, and other data.

Referring now to FIG. 3, there is shown a computer 100 receiving as inputs data 200 and instructions 300. The data 200 is described in terms of the type of information represented by the data, such as itinerary data 210, present location data 220, available battery charge 230, operational data 240, availability of recharge facilities at or en route to destination 250, cost of energy from available external electric power sources 260, cost of energy from onboard consumable fuel powered means 270, and other data 290. Like FIG. 2, FIG. 3 shows that outputs from the computer 100 may go directly to vehicle power system components

400 or may be presented to the operator via an in-vehicle audio and/or visual display 500.

In comparing FIG. 2 and FIG. 3, it should be observed that there is not a one-to-one correspondence in the way data 200 is described in the two drawings. Different embodiments of the invention may get any of various types of information, as shown in FIG. 3, from any of various types of sources, as shown in FIG. 2. For example, the original and/or present location of vehicle 210 may be obtained from transmitted data 201, from operator input data 204, or from other sources. As another example, operational data 240 may be obtained from database data 202, from operator input data 204, or from other sources. As a further example, available battery charge 230 may be obtained from vehicle sensor data 203, from operator input data 204, or from other sources. Similarly, operational data 240 may be obtained from database data 202, from operator input data 204, or from other sources. Likewise, availability of recharge facilities at or en route to destination 250 may be obtained from transmitted data 201, from database data 202, from operator input data 204, or from other sources. Also, the cost of energy from available external electric power sources 260 may be obtained from transmitted data 201, from database data 202, from operator input data 204, or from other sources. As a final example, the cost of energy from onboard consumable fuel powered means 270 may be obtained from transmitted data 201, from database data 202, from operator input data 204, or from other sources. The foregoing examples are for the purpose of illustration and not limitation. There is every reason to believe that all, or nearly all, types of information (FIG. 3) could be provided by all, or nearly all, types of data sources (FIG. 2).

Figure 4:
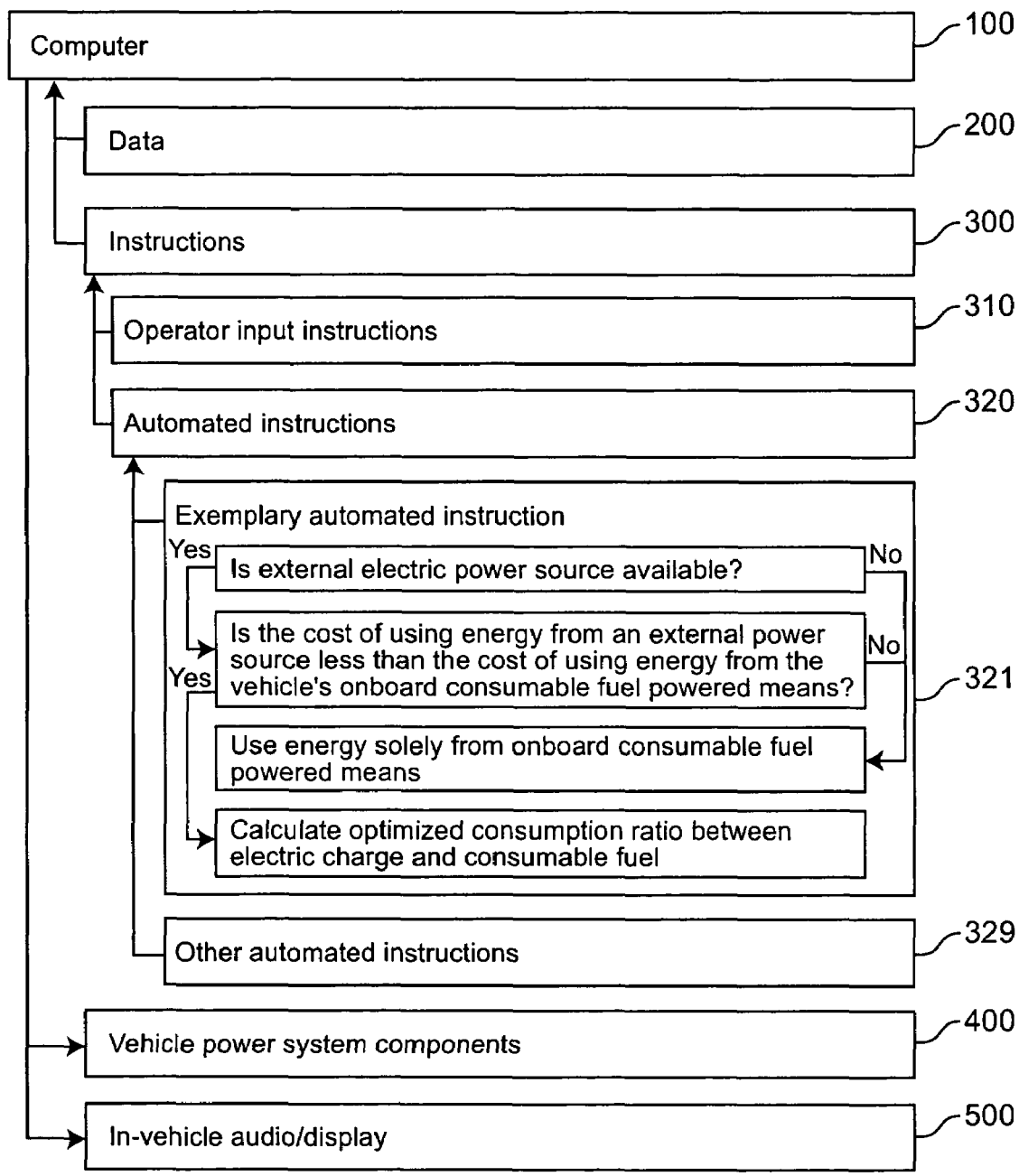
FIG. 4 is a representation of a computer, which is connected to the vehicle and to data sources and which may receive operator input instructions and/or automated instructions, including but not limited to instructions relating to a determination of whether to recharge solely from onboard consumable fuel powered means or to compute an optimal usage profile for the electric and conventional fuel to minimize the energy cost of the trip, and well as other automated instructions.

Referring now to FIG. 4, there is shown a computer 100 receiving as inputs data 200 and instructions 300. FIG. 4 also shows that outputs from the computer 100 may go directly to vehicle power system components 400 or may be presented to the operator via an in-vehicle audio and/or visual display 500. The instructions 300 may be either operator input instructions 310 or automated instructions 320, which are not restricted in type. Automated instructions may take the form of software, firmware, or any other form or combination of forms in which computer instructions may be automated. Automated instructions 320 may or may not be subject to reprogramming or other change. An exemplary automated instruction 321 would enable the computer 100 to determine, based on data 200 and potentially in conjunction other automated instructions 329, whether to recharge solely from onboard consumable fuel powered means or to compute an optimal usage profile for the vehicle's electric and conventional fuel in order to minimize the energy cost of the trip. The determination of the computer 100 could be output either directly to vehicle power system components 400 or to the in-vehicle audio and/or visual display, where it could be received by an operator who could then take appropriate action. Such operator action might include, but would not be limited to, an operator input instruction 310 to cause the computer to output the determined optimal energy usage profile directly to the vehicle power system components 400.

In one embodiment of the present invention, the computer calculates the point in the remaining portion of the trip at which the expected battery level will be just sufficient (with some safety margin according to the computer's instructions, which may be set by default or otherwise) to reach the destination without further consumption of conventional fuel. At the destination, the battery may then be recharged using an external static electrical power source.

In another embodiment of the present invention, the computer controls the vehicle's power system components and manages the consumption ratio between electric charge and consumable fuel so that consumption of consumable fuel may be optimized for cost-effectiveness.

In still another embodiment of the invention, instructions would address overall power consumption and overall cost optimization, in addition to reaching the destination at the lowest safe battery level. Further instructions according to the present invention will be readily apparent to persons ordinarily skilled in the art of computer measuring and optimization.

In a further embodiment of the present invention, the computer receives origin and location data and compares it, according to instructions given to the computer, to destination data, available battery charge data, operational data, data as to the availability of recharge facilities at or en route to the destination, data as to the cost of energy from available external electric power sources, data as to the cost of energy from onboard consumable fuel powered means, and other data. Depending on instructions, the computer could, for example, determine whether to recharge solely from onboard consumable fuel powered means or to compute an optimal usage profile for the electric and conventional fuel to minimize the energy cost of the trip, as discussed above and in FIG. 4. The result could be output from the computer either directly to vehicle power system components or to an in-vehicle audio and/or visual display device, where it could be received by an operator who could then take appropriate action. Such operator action might include, but would not be limited to, an operator input instruction to cause the computer to output the determined optimal energy usage profile directly to the vehicle power system components, as discussed above.

Use of different data sources, as in FIG. 2, to provide different types of information, as in FIG. 3, may result in different embodiments of the invention. For example, origin and location data could be provided by operator input, by GPS transmission, or by other sources.

Available battery charge data could be provided by operator input, by vehicle sensors, or by other sources.

Operational data could be provided by operator input, by database, or by other sources. A database of operational data could be compiled automatically as data is collected in the ordinary course of operation of the invention; alternatively, such a database could be compiled from vehicle performance specification data or from other sources.

Data as to the availability of recharge facilities at or en route to the destination could be provided by transmission, by database, by operator input, or by other sources. Data as to the availability of recharge facilities at or en route to the destination could be provided as GPS data used in conjunction with a database of facility locations, or provided directly by recharging facilities transmitting such location data to notify drivers en route. Alternatively, if the computer is located away from the vehicle and connected to the vehicle by wireless network or other means, notification of the availability of recharge facilities at or en route to the destination could be provided to the computer by other sources. Regardless of the data source by which such notification is provided, some embodiments of the invention would be capable of receiving data as to the availability of recharge facilities at or en route to the destination and adjusting the vehicle's optimization plan accordingly. Such adjustments could be calculated on the fly, according to automated instructions, with notification to the operator of the location of the recharging facility and of the energy cost savings if a recharging stop were made and the calculated adjustment were implemented. The operator could then input an instruction to accept or reject the adjustment.

Data as to the cost of energy from available external electric power sources could be provided by transmission, by database, by operator input, or by other sources. Regarding transmitted data as to the cost of energy from recharging facilities at or en route to the destination, such data could be provided directly by recharging facilities transmitting the data to notify drivers en route. Alternatively, if the computer is located away from the vehicle and connected to the vehicle by wireless network or other means, notification of the cost of energy from available external electric power sources at or en route to the destination could be provided by other sources. Regardless of the data source by which such notification is provided, some embodiments of the invention would be capable of receiving notification and adjusting the vehicle's refueling plan and the management of the consumption ratio between electric charge and consumable fuel so that consumption of consumable fuel may be optimized for cost-effectiveness. Such adjustments could be calculated on the fly, according to automated instructions, with notification to the operator of the location of the recharging facility and of the energy cost savings if a recharging stop were made and the calculated change in management of the consumption ratio were implemented. The operator could then input an instruction to accept or reject the adjustment.

Data as to the cost of energy from onboard consumable fuel powered means could be provided by database, by operator input, or by other sources.

Other data determined to be useful in any embodiment of the invention could be provided, as appropriate, by transmission, by database, by vehicle sensor, by operator input, or by other sources.

As noted above, some embodiments of the invention may locate the computer onboard the hybrid vehicle, while other embodiments may provide for the hybrid vehicle to be connected by wireless network or other means to a computer (including, but not limited to, a server) located somewhere else.

Some embodiments of the claimed invention may locate data sources (including, but not limited to, storage devices or databases) onboard the hybrid vehicle, while other embodiments may provide for the hybrid vehicle to be connected by wireless network or other means to one or more data sources (including, but not limited to, storage devices or databases) located somewhere else.

Figure 5:
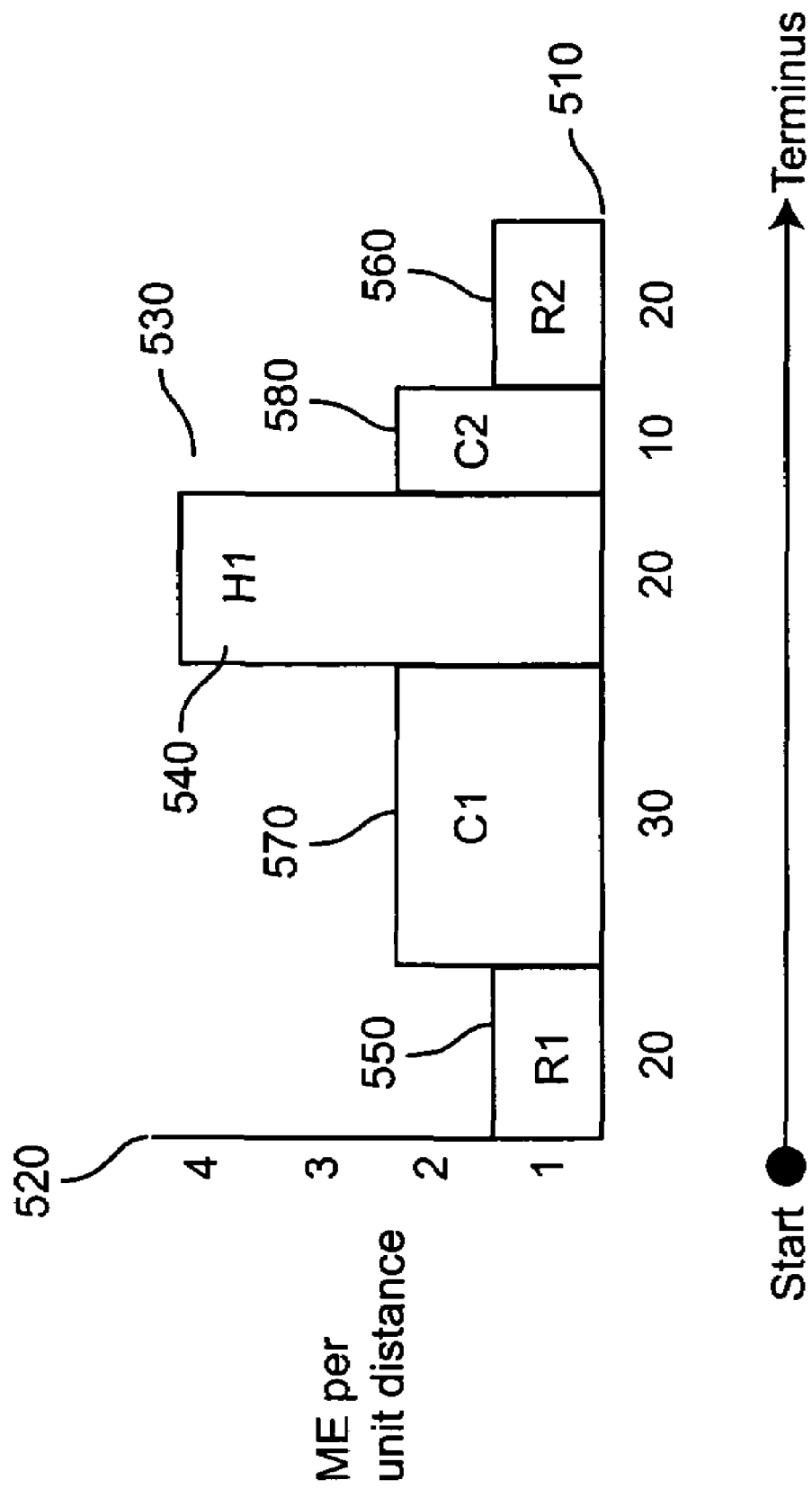
FIG. 5 is an example of an energy consumption profile for a hypothetical trip from some starting point to some terminus that reflects the variation in energy requirements as a function of the location indicated by distance from the start.

The following simple example shows the principle components of the present invention and its advantages over current state of the art. A driver plans a trip from her home to some destination such as her office. She enters the car and informs the system of here destination. The system accesses all available prior information about this destination and various routes to the destination and derives a graphic similar to that in FIG. 5 which shows the Mechanical Energy Consumption Profile of this trip. This data may come from historical data (previous trips the driver has taken along the same route), GPS data, topographical or other mapping data, etc. The horizontal axis 510 on the graph is distance from start to terminus. The vertical axis 520 is mechanical energy consumption per unit distance required at that point in the trip. The plot 530 is a profile that shows the amount of mechanical energy per unit distance that is required to propel the automobile at the given point in the trip assuming the normal rate of speed (e.g., based on speed limit information or historical data for the trip at the current time of day). The area under the profile is the total mechanical energy required for the trip; in this case, 200 units of mechanical energy. For exemplary purposes, we show the plot as rectilinear, not smoothly varying as would be the case for a real example. High region, H1 540 in the profile is that portion of the trip where more energy will be required. We label this region as with an "H" (for Hill) to indicate that the high energy requirements may be because of a steep uphill, though other explanations are possible such as stop/go traffic, or perhaps a very high rate of speed. The two lower energy required regions, R1, 550, and R2, 560, are those portions of the trip where less energy is required. These regions are labeled "R" (for residential). Such regions may occur because the car travels at moderate rates of speed, or is traveling downhill, or for a number of other reasons. The two regions, C1, 570, and C2, 580, labeled "C" (for cruising) are regions where moderate energy utilization is required. Such regions may occur where the car is traveling at a moderate rate of speed on level terrain. The different regions are called "terrain" types, for simplicity. Such profiles are dependent on the type of car, for examples, its shape and weight, on the terrain, and traffic patterns. All this information, and possibly additional information, is provided to the present system and is used to determine this Mechanical Energy Consumption Profile. Table 1 shows a summary of the graph in FIG. X for each region of the trip requires and includes the total distance and Table 2 shows the summary by terrain type and the total mechanical energy required to complete the trip according to this profile.

TABLE 1

| Region | Terrain | ME(T) per distance | Distance |
| --- | --- | --- | --- |
| R1, 550 | R | 1 | 20 |
| C1, 570 | C | 2 | 30 |
| H1, 540 | H | 4 | 20 |
| C2, 580 | C | 2 | 10 |
| R2, 560 | R | 1 | 20 |
| Total | | | 100 |

TABLE 2

| Terrain | ME(T) | Distance | Total ME(T) |
| --- | --- | --- | --- |
| R | 1 | 40 | 40 |
| C | 2 | 40 | 80 |
| H | 4 | 20 | 80 |
| Total | | 100 | 200 |

Suppose, for exemplary purposes only, that electricity from external power source costs $1 per unit battery energy (BE) and gasoline costs $2 per unit gasoline energy (GE). Column 2 of Table 3 shows the Efficiency-E of the electrical motor to convert the energy from the battery to mechanical energy as a function of the terrain type measured in units of ME/BE. This depends on the type of electrical motor, how that motor is connected to the drive wheels of the car, and many other factors, including the weight and design characteristics of the car. Column 3 of Table 3 shows the BE per unit distance required to move the car in the given terrain. This is computed from the formula:

$$ME/\text{unit distance}*(1/E\!f\!f\text{-}E)=BE/\text{unit distance}.$$

Column 4 of Table 3 shows the dollar Cost-E per unit distance, computed as the cost per BE (given above) times the BE per unit distance of Column 3. Similarly, Columns 5, 6 and 7 of Table 3 give the Efficiency-G of the gasoline motor to convert GE into ME as a function of the terrain, the GE/unit distance and the Cost-G per unit distance as a function of the terrain. (The inverse of GE/unit distance may be interpreted as miles per gallon, or some similar measure.)

TABLE 3

| Terrain | Eff-E | BE per unit dist | Cost-E per unit distance | Eff-G | GE per unit distance | Cost-G per unit distance |
|---------|-------|------------------|--------------------------|-------|----------------------|--------------------------|
| R | 1 | 1 | 1 | 1 | 1 | 2 |
| C | 2 | 1 | 1 | 3/2 | 4/3 | 8/3 |
| H | 2 | 2 | 1 | 3 | 4/3 | 8/3 |

The system also takes as input the amount of BE energy stored (BES) in the battery at the start of the trip (less any amount reserved as a safety margin). The current level of gasoline in the fuel tank may also be considered, however, it is assumed for the purposes of this example only that the gasoline can be refueled readily and conveniently on the trip (because it takes very little time to refuel and gasoline stations are generally available, whereas the battery recharging takes a long time and recharge facilities are not generally available).

Let r denote the total distance the car travels under battery power in the R regions, c denote the total distance the car travels under battery power in the C regions and h denote the total distance the car travels under battery power in the H regions. Then 40−r, 40−c and 20−h denote the total distance traveled under gasoline power for the regions R, C and H respectively. With these notations and the information in Tables 2 and 3 above, the total cost of electricity (TotalCostE) used is given by the formula $$\text{TotalCost}E = 1*r + 1*c + 2*h$$

And the total cost of gasoline (TotalCostG) used is given by the formula:

$$\text{TotalCost}G = 2*(40-r) + (8/3)*(40-c) + (8/3)*(20-h).$$

The total amount of BE (TotalBE) used is given by $$\text{Total}BE = 1*r + 1*c + 2*h \quad (1)$$

and the total amount of GE (TotalGE) used is given by $$\text{Total}GE = 1*(40-r) + (4/3)*(40-c) + (4/3)*(20-h).$$

Because we assume that refueling gasoline is available on the trip, this expression is not needed for this example.

The present system will determine, based on the input data above and any additional data available and applicable, an optimal profile of battery usage versus gasoline usage in order to minimize the total cost of the trip, which is given by TotalCost=TotalCostE+TotalCostG and is summarized by the formula:

$$\text{TotalCost} = 240 - r - (5/3)c - (2/3)h \quad (2)$$

According to the current state of the art, the battery will be consumed first, and then if the terminus has not been reached convert to gasoline usage. If the total energy required for the trip is less than the amount of energy in the battery (less any safety margin provided as input), the present system will determine that the optimal usage profile is to follow the simple model of the current state of the art: that is, to use the battery until the terminus is reached. If, on the other hand, the total energy required exceeds the BES, the present system will determine an optimal profile of battery usage versus gasoline usage per terrain type to minimize the TotalCost as given in formula (2), but subject to the other constraints in the system.

Suppose, for example only, that the battery has BES=50 and that either there is sufficient gas to complete the journey (within the safety margin) or that refueling stations will be available along the trip, if necessary. The current state of the art will consume all the battery first, and then revert to gasoline. This means that the 50BE units in the battery will be consumed by traversing region R1, 550, completely, then traversing all of C1, 570, at which point the battery will be exhausted. This means that r=20, c=30 and h=0, giving by formula (2) a TotalCost=$170.

The present system will examine the optimization problem of minimizing formula (2) subject to the constraints:

$$0 \leq r \leq 40$$

$$0 \leq c \leq 40$$

$$0 \leq h \leq 20$$

$$r + f + 2h = 50.$$

The first three inequalities come from the fact that the distance traveled under battery in each terrain type (r, c, h) must be at least zero and cannot exceed the total size of the regions of each terrain type. The last equality is the condition that we consume all the battery energy by the end of the trip. More generally, this may be stated as an inequality, but for the purposes of this example, is given as an equality. (The formulation as an inequality incorporates the initial step where the total energy required is compared against the BES.) The solution of this system occurs when r=10, c=40, h=0 for which the total cost of the trip is $163.34. This improves on the current state of the art. For this simple example, it does not matter in which of the two R regions the r=10 distance is traversed, or in which order (similarly for c and h). In a more complex and real environment where the profile is not as discrete and flat, such artifacts of the solution are unlikely.

After computing this optimal solution, the system may inform the driver of the battery/gas utilization profile or it may autonomically handle the transition to and from battery and gas utilization.

Though the example given here is presented as a static offline problem with all data available at the start of the trip, it exemplifies the principles of the present invention. More generally and within the scope of the invention is a dynamic online system that constantly takes the complete set of available inputs and determines the optimal predictive profile for the trip. For example, the system may determine based on real-time conditions that a detour around the hill is possible and more cost effective and may provide that input to the driver.

While the invention has been described in terms of a set of preferred embodiments, those skilled in the art will recognize that the invention can be practiced with modification within the spirit and scope of the appended claims.

Having thus described our invention, what we claim as new and desire to secure by Letters Patent is as follows:

1. A system for optimizing energy consumption comprising:
   a plug-in hybrid electric vehicle having a battery-powered electric motor and a consumable fuel powered means,
   a battery powering said electric motor being rechargeable both from an external electric power source and from said consumable fuel powered means, and a computer receiving data and instructions as inputs and providing outputs, said data inputs describing an itinerary of said vehicle, operational data, available battery charge, availability and cost of energy from external electric power sources, availability and cost of consumable fuel for consumable fuel powered means, said instruction inputs enabling said computer to determine an optimal mix of energy from external electric power sources and energy from consumable fuel in said hybrid vehicle for a given itinerary, and said outputs describing said optimal mix of energy in said hybrid vehicle for displays.

2. The system according to claim 1 wherein said data inputs include global positioning satellite data.

3. The system according to claim 1, wherein said data inputs include data transmitted over radio frequency spectrum.

4. The system according to claim 1, wherein said data inputs include data from a database.

5. The system according to claim 1, wherein said data inputs include data from said vehicle's sensors.

6. The system according to claim 1, wherein said data inputs include data input by an operator.

7. The system according to claim 1, wherein said instructions are input by an operator.

8. The system according to claim 1, wherein said instructions are automated instructions.

9. The system according to claim 1, wherein said outputs are provided for presentation to the operator via a display device.

10. The system according to claim 9, wherein said display device is an audio display device.

11. The system according to claim 9, wherein said display device is a visual display device.

12. The system according to claim 1, wherein said outputs provide the operator with the option of implementing said optimal mix of energy in said hybrid vehicle.

13. The system according to claim 1, wherein the consumable fuel powered means is an internal combustion engine.

14. The system according to claim 1, wherein the consumable fuel powered means is a fuel cell.

15. The system according to claim 1, wherein power may be provided to the vehicle drive system by the electric motor and/or the consumable fuel powered means.

16. The system according to claim 1, wherein said outputs are provided directly to vehicle power system components.

17. A method for optimizing energy consumption in a plug-in hybrid electric vehicle having a battery-powered electric motor and a consumable fuel powered means, comprising the steps of:

recharging the battery powering said electric motor either from an external electric power source or from said consumable fuel powered means; and receiving by a computer data and instructions as inputs and providing outputs by said computer, said data inputs describing the itinerary of said vehicle, operational data, available battery charge, availability and cost of energy from external electric power sources, availability and cost of consumable fuel for consumable fuel powered means, said instruction inputs enabling said computer to determine an optimal mix of energy from external electric power sources and energy from consumable fuel in said hybrid vehicle for a given itinerary, and said outputs describing said optimal mix of energy in said hybrid vehicle for displays.

18. The method according to claim 17, wherein said instructions are automated instructions.

19. The method according to claim 17, wherein said instructions are input by an operator.

20. The method according to claim 17, wherein said data inputs include global positioning satellite data.

21. The method according to claim 17, wherein said data inputs include data transmitted over radio frequency spectrum.

22. The method according to claim 17, wherein said data inputs include data from a database.

23. The method according to claim 17, wherein said data includes data from said vehicle's sensors.

24. The method according to claim 17, wherein said data inputs include data input by an operator.

25. The method according to claim 17, wherein power may be provided to the vehicle drive system by the electric motor and/or the consumable fuel powered means.

26. The method according to claim 17, wherein said outputs are provided directly to vehicle power system components.

27. The method according to claim 17, wherein said outputs are provided for presentation to the operator via an in-vehicle display device.

28. The method according to claim 27, wherein said display device is an audio display device.

29. The method according to claim 27, wherein said display device is a visual display device.

30. The method according to claim 17, further comprising the step of providing the operator with the option of implementing said optimal mix of energy in said hybrid vehicle.

31. The method according to claim 17, wherein the consumable fuel powered means is an internal combustion engine.

32. The method according to claim 17, wherein the consumable fuel powered means is a fuel cell.

* * * * *